Figure 2:
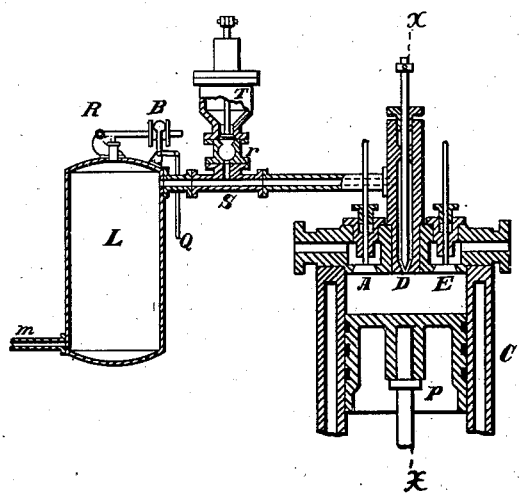

No. 673,160. Patented Apr. 30, 1901.
R. DIESEL.
METHOD OF IGNITING AND REGULATING COMBUSTION FOR INTERNAL COMBUSTION ENGINES.
(Application filed Apr. 6, 1898.)
(No Model.) 2 Sheets—Sheet 1.

WITNESSES:
L. N. Legendre
G. W. Eisenbraun

INVENTOR
Rudolf Diesel
BY
ATTORNEY

No. 673,160. Patented Apr. 30, 1901.
R. DIESEL.
METHOD OF IGNITING AND REGULATING COMBUSTION FOR INTERNAL COMBUSTION ENGINES.
(Application filed Apr. 6, 1898.)
(No Model.) 2 Sheets—Sheet 2.

WITNESSES:
Edgeworth Greene
Theodore T. Horman

INVENTOR
Rudolf Diesel
BY
Wetmore & Jenner
HIS ATTORNEYS

UNITED STATES PATENT OFFICE.

RUDOLF DIESEL, OF MUNICH, GERMANY, ASSIGNOR TO DIESEL MOTOR COMPANY OF AMERICA, OF NEW YORK, N. Y.

METHOD OF IGNITING AND REGULATING COMBUSTION FOR INTERNAL-COMBUSTION ENGINES.

SPECIFICATION forming part of Letters Patent No. 673,160, dated April 30, 1901.

Application filed April 6, 1898. Serial No. 676,621. (No specimens.)

*To all whom it may concern:*

Be it known that I, RUDOLF DIESEL, residing at Munich, in the Kingdom of Bavaria, German Empire, have invented a certain new and useful Method of Igniting and Regulating Combustion for Internal-Combustion Engines, of which the following is a specification, reference being had to the accompanying drawings for a full disclosure.
All internal-combustion engines which compress a combustible mixture and ignite the same at or near the end of the compression-stroke of the piston in any manner whatsoever allow the combustion which results from such ignition to take its own course—*i. e.*, they do not regulate or control the ensuing combustion by any action of the machine itself. This neglect leads to important difficulties and irregularities. The governing of such machines is difficult and unsatisfactory. When such governing is attempted by changing the composition or proportion of the mixture while retaining the same apparatus for igniting, mixtures which contain much combustible matter, as required when working at full load, often ignite too suddenly and violently, while, on the other hand, the action of mixtures for light loads containing less combustible matter is apt to be characterized by slow and retarded ignition, because the velocity of propagation of such ignition varies with the proportion of the mixture in very wide limits. Every mixture therefore of a combustible with air or with oxygen follows its own course, different from that of other mixtures, as recorded by indicator-diagrams. The igniting-point of a combustible is that temperature up to which the mixture under the given pressure must be heated before the combustible will ignite. The igniting-point of any given combustible for a given pressure and a given proportion of the mixture of such combustible with air has a constant value, depending on the physical properties of the combustible. On the other hand, different combustibles have different igniting-points under the same condition of mixture and pressure. This variation can be further increased by variation in the pressure or in the proportions of the mixture to which the various combustibles are subjected before or during ignition. If, therefore, in internal-combustion engines regulation or governing is attempted by changing the quantity of the working mixture while keeping its proportions practically constant, the velocity with which ignition is propagated through the mixture will also vary, because the amount of compression and the resulting temperature must vary with this quantity. Therefore each change in the load will change the course of the combustion; but the course of the combustion after ignition vitally influences the efficiency or economy of the whole process. When the most economical course of combustion has once been determined, it is of the greatest importance to retain such control of the combustion as to make it follow such course.

It follows from the foregoing that if a given mixture is compressed to a degree below its igniting-point, but higher than the igniting-point of a second or auxiliary combustible, then injecting this latter into the first compressed mixture will induce immediate ignition of the secondary fuel and gradual combustion of the first mixture, the combustion after ignition depending on the injection of the igniting or secondary combustible.

The nature of my invention will best be understood when described in connection with the accompanying drawings, in which—

Figure 1:
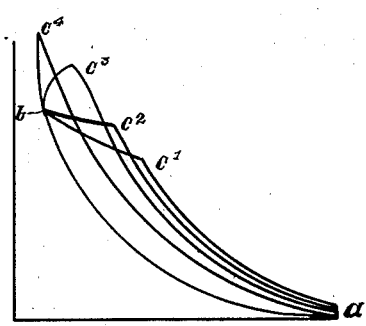
Figure 3:
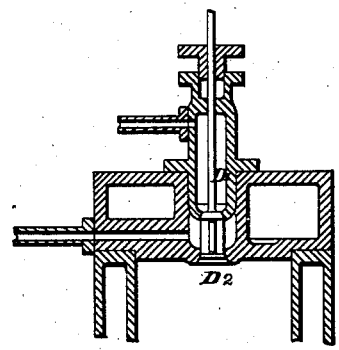
Figure 4:
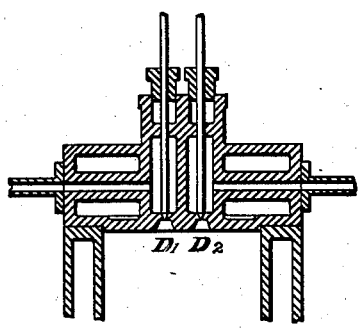
Figure 5:
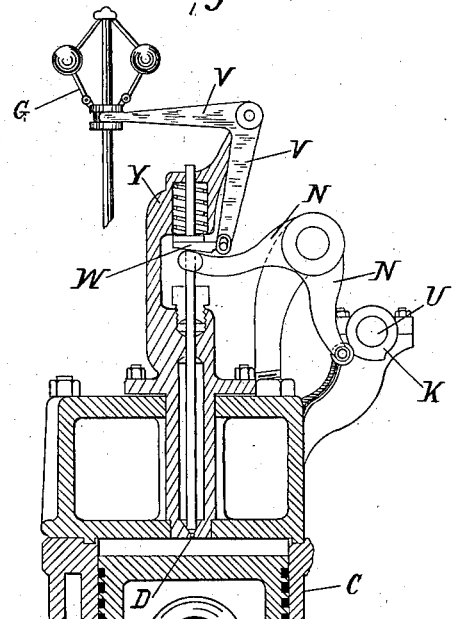
Figure 6:
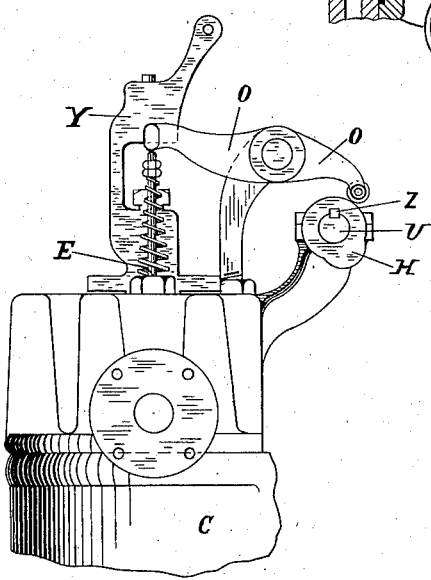
Figure 7:
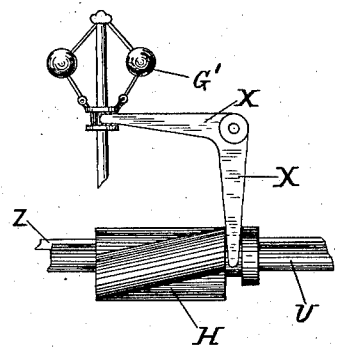

Figure 1 represents certain diagrams or indicator-cards which indicate to those skilled in the art the method of action of the combustible in the working cylinder of an internal-combustion engine. Fig. 2 represents the essential working parts of one form of apparatus for carrying out my invention, the valve-operating parts being removed for greater clearness. Fig. 3 represents a modification of the upper part of the working cylinder of such internal-combustion engine. Fig. 4 represents another modification of the same. Fig. 5 is a view, partly in section, of the injection-valve D and its operating mechanism, the section being taken on the line *x x* of Fig. 2 looking from the right. For greater clearness the operating mechanism of the valve A immediately behind has been omitted. Fig. 6 is a view of the operating mechanism of the valve E looking from the right-hand side, Fig. 1. For greater clearness the connection of the cam H to the governor and the operating mechanisms for the valves D and A immediately behind have been omitted. Fig. 7 is a detail of the means for controlling the position of the cam H by the governor.

Similar letters of reference designate corresponding parts throughout the several views of the drawings.

Let $a\,b$ in Fig. 1 represent the compression curve of the mixture of high igniting-point, and let the injection of the combustible of low igniting-point take place in the neighborhood of the dead-point $b$ of the piston. Then a slow and gradual injection of the secondary combustible will cause a slow propagation of ignition and a slow gradual combustion, (indicated by the curve $b\,c'$.) A substantially sudden injection will induce an instantaneous combustion on the line $b\,c^4$ and between both extremes various curves according to $b c^3\, b c^2$, &c., may be obtained.

One apparatus for carrying out this method is shown at Fig. 2, in which C shows the cylinder of an internal-combustion engine; P, its piston; E, its inlet-valve for mixed air and combustible; A, its discharge-valve for exhaust-gases, and D its injection nozzle or valve for the igniting or secondary combustible, which is taken from the reservoir L. This reservoir is supplied at $m$ by a pressure-pump. (Not shown.) The igniting or secondary combustible may be gaseous, vaporous, liquid, or pulverulent, or a mixture of these, and may also be mixed with air. When liquids are used, they may be pumped direct into the twyer or nozzle of the injection-valve D, or they may be mixed from a feed apparatus T with a jet of gas or air flowing from the reservoir L at the point S. This latter method may also be used when pulverulent combustibles are used. In both these latter cases the vessel L may contain pure air, which then serves simply as a carrier for the combustibles mixed with it. The time and duration of the opening of the needle-valve D—$i.\,e.$, the period of admission of the igniting or secondary combustible—are regulated by the usual well-known means. This, together with the excess of pressure in the vessel L (or in the nozzle D) by which the injection of the igniting combustible into the compression-space of the cylinder is effected, determines the course of combustion. (See diagram Fig. 1.) The combustible in the working cylinder may have any desired proportion of air mixed with it. The temperature of the working mixture in the cylinder may also be influenced by mixing with it a portion of the spent gases remaining from the previous piston-stroke, and the secondary combustible may be used at any suitable temperature.

Any well-known device may be used for determining and regulating the amount of opening and the periods of opening the igniter injection-valve D, such as cams, wedges, or tripping arrangements as used in steam-engines for governing the admission of steam. Fig. 5 shows a wedge regulator operated from the governor for varying the admission of the secondary combustible. Fig. 6 shows a cam mechanism for varying the admission of the primary combustible. Upon suitable standards the cam-shaft U is carried and bears opposite the valve D the fixed cam K. This operates on one arm of the bell-crank lever N, suitably supported, the other arm of which has yielding connection with the stem of the valve D. Above the end of said stem is a wedge W, so mounted as to be interposed in and to limit to a greater or lesser extent the path of movement of the stem. Its position is determined by the governor G, to which it is connected by the bell-crank lever V, suitably supported on the standard Y. The speed of the governor therefore determines the amount of opening of the valve D. The valve E for admitting primary combustible is operated from the cam H on the shaft U through the suitably-supported bell-crank O. The cam H is splined on the shaft U at Z and is thereby compelled to rotate with it, but can be shifted axially thereon to cause different portions of the obliquely-placed cam projection to engage with the lever O at different times, and thereby to vary the period of admission of the primary combustible. The position of cam H is determined by governor G', operating through the suitably-mounted bell-crank X, which engages in a concentric groove at one end of the cam, as shown in Fig. 7. Any change in speed of the governor causes a corresponding change in the position of cam H, and consequently in the period of admission of valve E. The mechanism to operate valve A may be supplied with either or both of the above regulating devices. I do not limit myself to the use of the above mechanisms as described, but I may use them interchangeably or in conjunction on any of my valves or any other suitable mechanisms. The excess of pressure with which the secondary combustible is injected into the compression-space may be varied by the size and speed of the pumps producing this excess of pressure and be regulated by a pressure-regulating valve or any other well-known means.

In Figs. 3 and 4 air or gas may be injected through the needle-valve D' and a liquid combustible through the needle-valve D². In this case the mixture of the two takes place during their injection into the compression-space of the working cylinder.

What I claim as new is—

1. The method of regulating combustion in internal-combustion engines which consists in producing a mixture of air or oxygen and a combustible, compressing the mixture to a temperature lower than the igniting-point of the combustible, and introducing under excess of pressure into the mixture a secondary combustible, the igniting-point of which is equal to or below the temperature due to the compression, substantially as described.

2. The method of regulating combustion in internal-combustion engines, which consists in producing a mixture of air or oxygen and a combustible, compressed to a temperature lower than the igniting-point of the combustible, and introducing under excess of pressure into the mixture a secondary combustible, the igniting-point of which is equal to or below the temperature due to the compression, substantially as described.

3. The method of regulating combustion in internal-combustion engines, which consists in producing a mixture of air or oxygen and a combustible, compressed to a temperature lower than the igniting-point of the combustible, introducing into the mixture a secondary combustible, the igniting-point of which is equal to or below the temperature due to the compression, and regulating the quantity and duration of admission of such secondary combustible while expanding against a resistance, substantially as described.

In testimony whereof I have hereunto set my hand in the presence of two subscribing witnesses.

RUDOLF DIESEL.

Witnesses:
 PAUL FLASCHE,
 EMIL WENZEL.